US008297172B2

(12) United States Patent
Nelson et al.

(10) Patent No.: US 8,297,172 B2
(45) Date of Patent: Oct. 30, 2012

(54) UNMANNED AIR VEHICLE WEAPON ADAPTER

(75) Inventors: Kent C. Nelson, Simi Valley, CA (US); Kenneth Nash, Moorpark, CA (US); Dennis C. Philpot, West Hills, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 822 days.

(21) Appl. No.: 12/269,731

(22) Filed: Nov. 12, 2008

(65) Prior Publication Data

US 2010/0282058 A1   Nov. 11, 2010

(51) Int. Cl.
B64D 7/06 (2006.01)

(52) U.S. Cl. ............... 89/37.16; 89/43.01; 89/42.01; 89/27.3

(58) Field of Classification Search .......... 89/37.01, 89/37.04, 37.14, 37.16, 37.17, 42.01, 44.01, 89/27.3, 37.21, 43.01, 43.02, 44.02; 42/94
See application file for complete search history.

(56) References Cited

U.S. PATENT DOCUMENTS

| | | | | |
|---|---|---|---|---|
| 420,170 A | * | 1/1890 | Seabury | 89/37.01 |
| 1,595,993 A | * | 8/1926 | Cecero | 89/133 |
| 1,757,244 A | * | 5/1930 | Green | 89/44.01 |
| 2,016,211 A | * | 10/1935 | Miranda | 89/37.16 |
| 2,284,611 A | * | 5/1942 | Barnhart | 89/41.02 |
| 2,304,566 A | * | 12/1942 | Haberlin | 89/134 |
| 2,333,398 A | * | 11/1943 | Trotter et al. | 89/42.01 |
| 2,336,557 A | * | 12/1943 | McCallister | 89/37.17 |
| 2,354,114 A | * | 7/1944 | Growald | 89/37.21 |
| 2,371,004 A | * | 3/1945 | Unterman | 89/37.19 |
| 2,380,470 A | | 7/1945 | Schneider | |
| 2,409,404 A | * | 10/1946 | Trotter | 89/42.01 |
| 2,433,843 A | * | 1/1948 | Hammond, Jr. et al. | 89/37.16 |
| 2,704,489 A | * | 3/1955 | Hammond, Jr. et al. | 89/41.02 |
| 2,704,490 A | * | 3/1955 | Hammond, Jr. | 89/41.07 |
| 2,731,829 A | * | 1/1956 | Wigington et al. | 73/167 |
| 3,126,791 A | * | 3/1964 | Chiabrandy | 89/42.01 |
| 3,438,304 A | | 4/1969 | Sautier et al. | |
| 3,828,458 A | * | 8/1974 | Skone-Palmer | 42/69.01 |
| 3,969,982 A | * | 7/1976 | Pier-Amory et al. | 89/178 |
| 4,084,480 A | | 4/1978 | Moscrip | |
| 4,587,881 A | * | 5/1986 | Clayson et al. | 89/37.16 |
| 5,024,138 A | | 6/1991 | Sanderson et al. | |
| 5,056,410 A | * | 10/1991 | Pitts | 89/37.04 |
| 6,223,644 B1 | * | 5/2001 | Troncoso | 89/136 |
| 6,263,776 B1 | | 7/2001 | Rostocil | |
| 6,286,411 B1 | * | 9/2001 | Sanderson | 89/37.16 |
| 6,868,768 B1 | * | 3/2005 | Gieseke et al. | 89/1.13 |
| 7,047,863 B2 | * | 5/2006 | Hawkes et al. | 89/37.04 |
| 7,207,256 B2 | | 4/2007 | O'Dwyer | |
| 7,650,826 B2 | * | 1/2010 | Son et al. | 89/27.3 |
| 7,866,247 B2 | * | 1/2011 | Son et al. | 89/27.3 |
| 2004/0219491 A1 | * | 11/2004 | Shlomo | 434/11 |

(Continued)

FOREIGN PATENT DOCUMENTS

GB        2105827 A   *   3/1983

*Primary Examiner* — Jonathan C Weber

(74) *Attorney, Agent, or Firm* — Vidas, Arrett & Steinkraus

(57) ABSTRACT

In some embodiments, an adapter for attaching a handheld firearm to an unmanned air vehicle comprises a mounting assembly configured for attachment to said firearm and to the unmanned air vehicle, and an actuation assembly comprising an actuation device configured to actuate a trigger of the handheld firearm.

21 Claims, 13 Drawing Sheets

U.S. PATENT DOCUMENTS

| | | |
|---|---|---|
| 2005/0127242 A1 | 6/2005 | Rivers, Jr. |
| 2007/0023582 A1 | 2/2007 | Steele et al. |
| 2007/0051235 A1* | 3/2007 | Hawkes et al. ............. 89/37.04 |
| 2007/0204745 A1* | 9/2007 | Son et al. ..................... 89/27.3 |
| 2007/0256346 A1* | 11/2007 | Potterfield et al. ................ 42/94 |
| 2010/0083817 A1* | 4/2010 | Son et al. ..................... 89/27.3 |
| 2010/0279649 A1* | 11/2010 | Thomas .................... 455/404.2 |

* cited by examiner

UNMANNED AIR VEHICLE WEAPON ADAPTER

FIELD OF THE INVENTION

This invention is directed to a weapon adapter for an unmanned aerial vehicle (UAV). More specifically, this invention relates to a system for mounting a weapon, such as an existing handheld weapon, to a UAV and operating the weapon remotely.

BACKGROUND OF THE INVENTION

Unmanned aerial vehicles are generally known in the art, and vary greatly in size and capability. Larger UAVs are capable of carrying relatively large weapons, such as Hellfire missiles, but tend to be louder, more expensive and easier for an enemy to detect than small, lightweight UAVs. The large weapons typically carry a dedicated rocket motor, and are able to release from the large UAV without imparting considerable force to the UAV.

Smaller UAVs have not been capable of carrying the large weapons commonly associated with aircraft. There remains a need for smaller, lightweight UAVs that are capable of attacking a target.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, an adapter for attaching a handheld firearm to an unmanned air vehicle comprises a mounting assembly configured for attachment to said firearm and to the unmanned air vehicle, and an actuation assembly comprising an actuation device configured to actuate a trigger of the handheld firearm.

In some embodiments, the mounting assembly further comprises a recoil absorbing/isolating device.

In some embodiments, the actuation assembly further comprises a second actuation device configured to actuate a safety mechanism of the handheld firearm.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
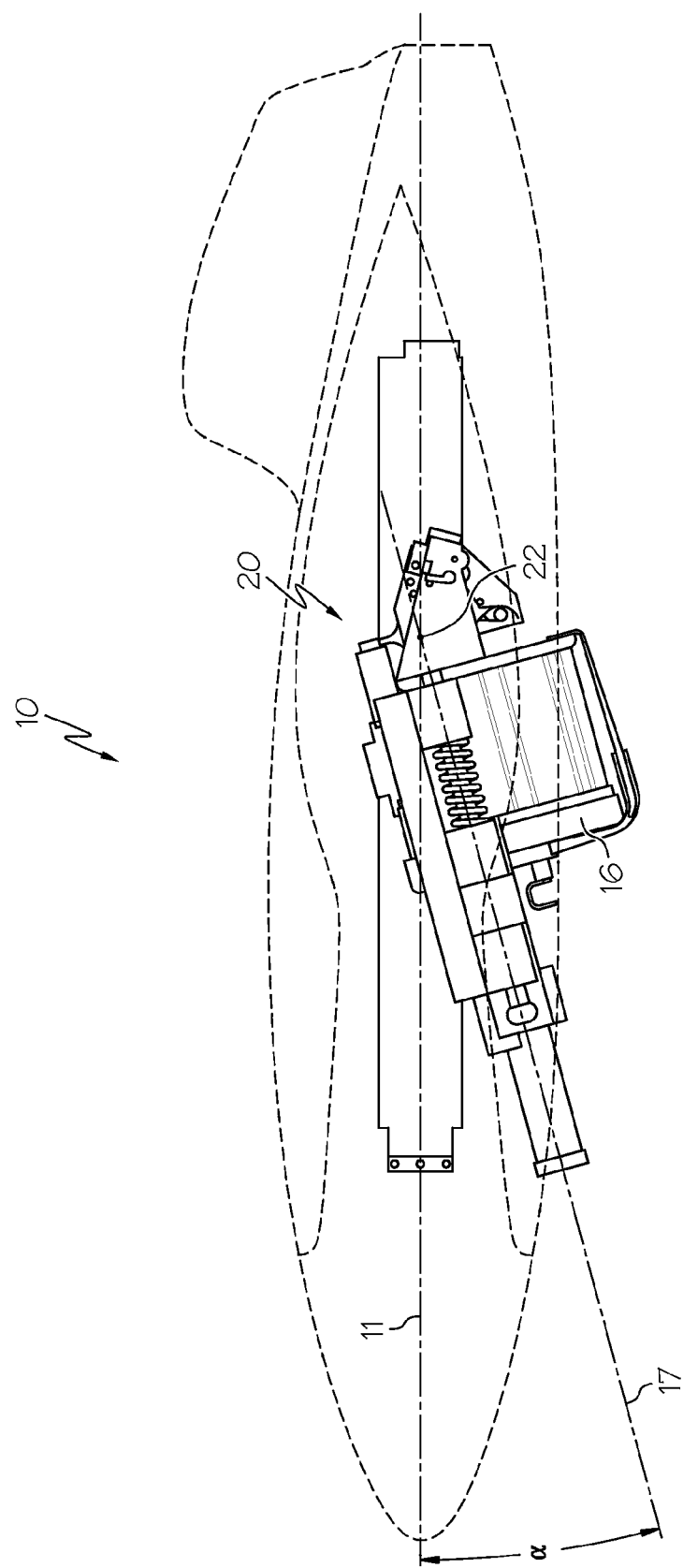
FIG. 1 shows a side view of a UAV equipped with an embodiment of a handheld weapon and adapter system.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the Figures shall refer to like features unless otherwise indicated.

FIG. 1 shows an embodiment of an unmanned aerial vehicle 10 (UAV) comprising an adapter 20 for attaching a weapon 16 to the UAV 10. In some embodiments, the UAV 10 comprises a Killer Bee from Swift Engineering (http://www.killerbeeuas.com). In some embodiments, the UAV 10 comprises a wingspan of 10 feet or less, and an unloaded weight of 123 pounds or less. In various embodiments, the weapon 16 is any weapon suitable for use with the UAV 10, which is generally a weapon that can be fired by hand. For example, in the case of a small, relatively lightweight UAV, an existing handheld weapon, such as a pistol, rifle, shotgun, grenade launcher or the like, can be used. In various embodiments, a weapon can be single shot, multiple shot, semi-automatic, fully automatic, etc. As illustrated in FIG. 1, the weapon 16 comprises a grenade launcher such as the M32 Multiple Grenade Launcher or the extended range XRGL40. In some embodiments, the weapon 16 comprises a weight of approximately 14.2 pounds, and the ammunition comprises a rounds at 0.5 pounds each. The total weight of the loaded weapon comprises approximately 17.2 pounds. In some embodiments, the total weight of the UAV 10 with a loaded weapon 16 and the weapon adapter 20 is approximately 150 pounds or less. In some embodiments, recoil forces generated by the weapon 16 comprise impulse forces that are considerably higher than the weight of the UAV 10. For example, an M32 grenade launcher can generate impulse forces of 624 pounds or more—more than four times the total weight of the loaded UAV 10 assembly. Thus, in some embodiments, nominal recoil forces acting upon the UAV 10 are greater than 4 Gs. The adapter 20 allows the UAV 10 to maintain stable flight while carrying a weapon 16 that generates G loads of 2, 3, 4 or 5 or more Gs of recoil force.

The weapon 16 defines an axis 17, such as a barrel axis (e.g. the axis along which a launched projectile is initially vectored). Generally, recoil forces caused by the launch of the projectile will act in the direction of the barrel axis 17. The UAV can define a UAV axis 11. In some embodiments, the UAV axis can comprise a central axis of the UAV, and the center of gravity 22 of the UAV is located along the UAV axis. In some embodiments, the weapon/barrel axis 17 intersects the UAV axis 11 at the center of gravity 22. Thus, recoil forces from the weapon 16 are applied through the centroid of the UAV, aiding in stability. In some embodiments, the weight of the adapter 20 is included in determining the center of gravity 22. In some embodiments, the weight of the weapon 16 and the adapter 20 is included in determining the center of gravity 22.

In various embodiments, the weapon axis 17 can have any suitable orientation with respect to the UAV axis. When configured for ground attack, the weapon axis 17 is preferably oriented at an angle α to the UAV axis 11. The angle a can be of any suitable magnitude. In some embodiments, the angle α ranges from 5-20 degrees. In some embodiments, the angle α is approximately 15 degrees.

Figure 2:
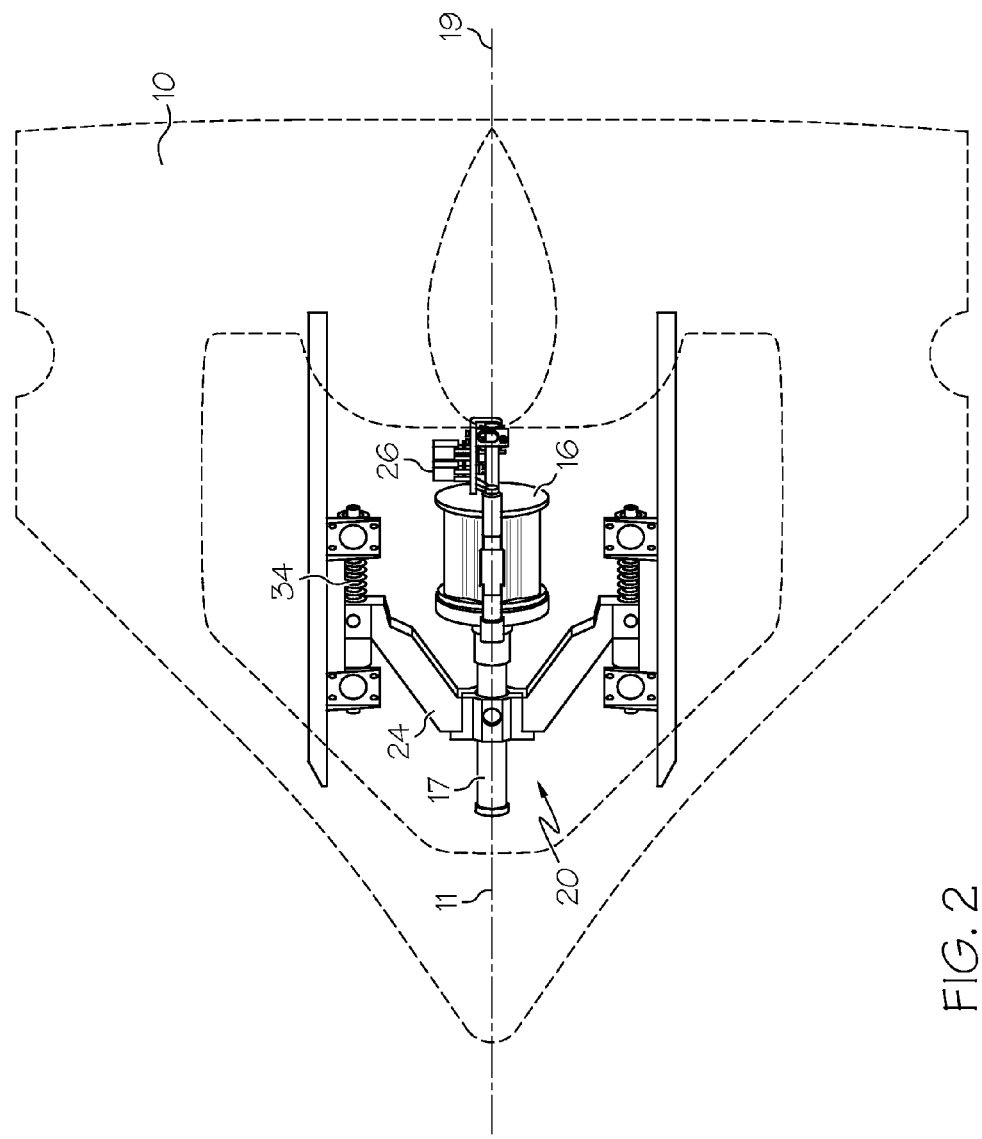
FIG. 2 shows a top view of a UAV equipped with an embodiment of a handheld weapon and adapter system.

FIG. 2 shows a top view of an embodiment of a UAV 10 comprising an adapter 20 for attaching and operating a weapon 16. As shown in the embodiment of FIG. 2, the adapter 20 is centrally stationed in the UAV 10. In some embodiments, an axis 17 of the weapon 16 can be oriented in the same plane 19 as the UAV axis 11. In some embodiments, the plane 19 is vertically oriented. In some embodiments, the adapter 20 comprises a mounting assembly 24 that attaches the weapon 16 to the UAV 10. In some embodiments, the mounting assembly 24 comprises a recoil absorption and/or isolation mechanism 34. In some embodiments, the adapter 20 comprises an actuation assembly 26 arranged to fire the weapon 16.

Figure 3:
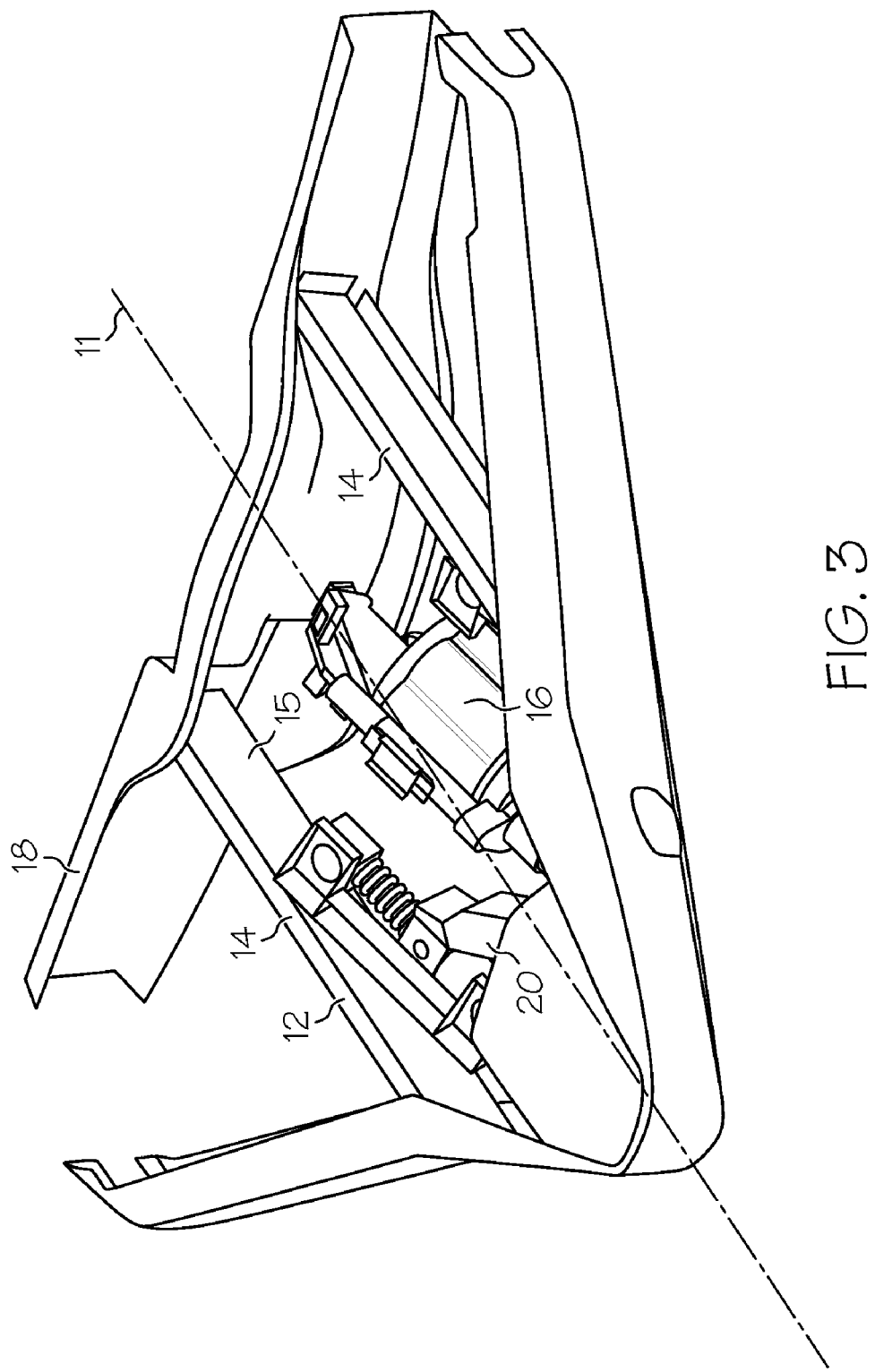
FIG. 3 shows an orthographic view of structural components of a UAV equipped with an embodiment of a handheld weapon and adapter system.

FIG. 3 shows a partial view of structural elements 18 of an embodiment of a UAV 10, which can include a mounting structure 12 to which the mounting assembly 24 can be attached. In some embodiments, the mounting structure 12 comprises a pair of mounting rails 14. In some embodiments, the rails 14 extend parallel to one another and each defines a flat surface 15 configured for attachment to the mounting assembly 24. The parallel flat surfaces 15 allow for the orientation of the mounting assembly 24 to be easily adjusted, as the mounting assembly 24 can be moved fore and aft, and can also be rotated to adjust the orientation of the axis 17 of the weapon 16 (see FIG. 1). The mounting structure 12 can comprise any suitable configuration for attaching the adapter 20 to the UAV 10. In some embodiments, portions of the UAV mounting structure 12 can extend parallel to the UAV longitudinal axis 11.

Figure 4:
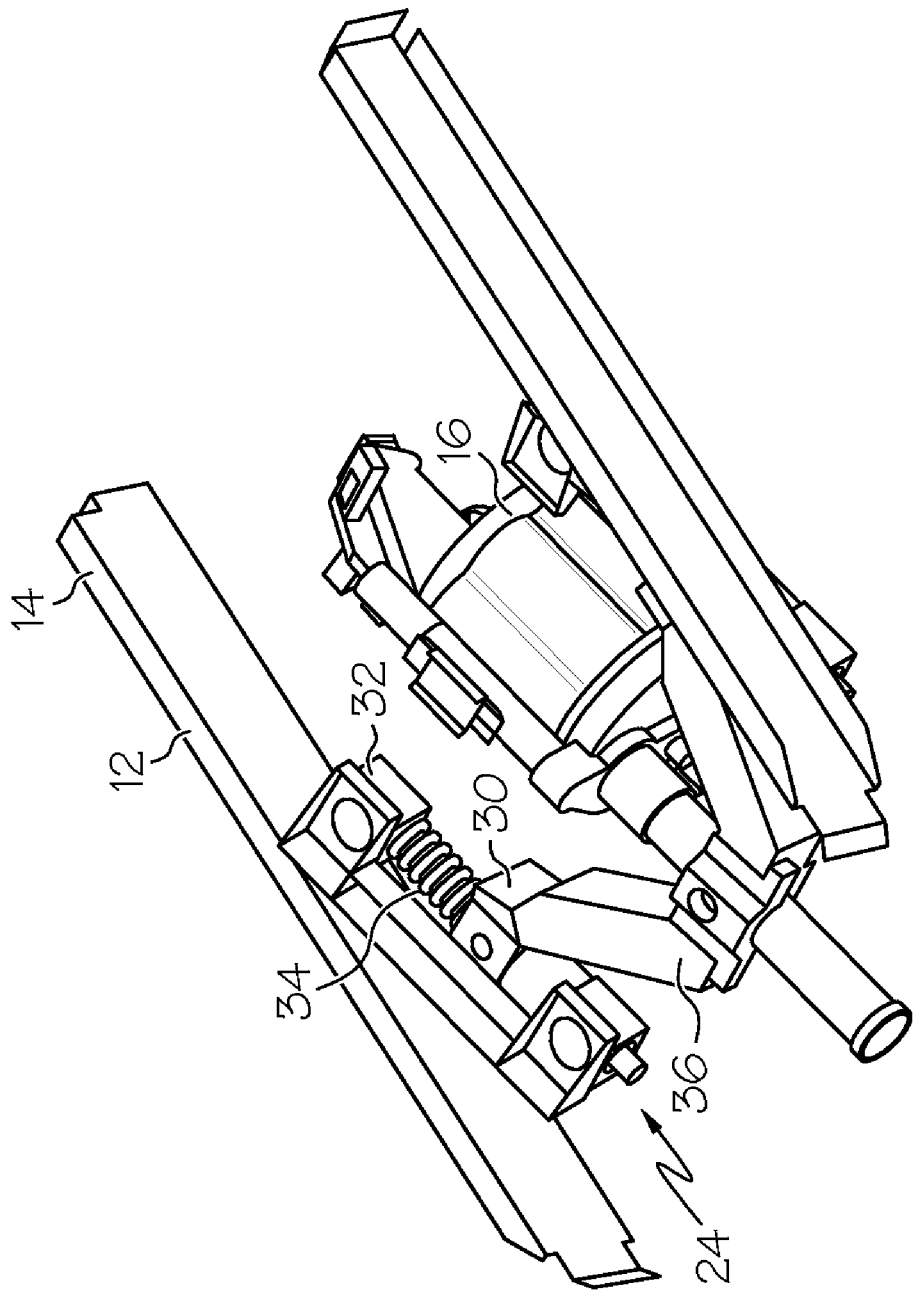
FIG. 4 shows an orthographic view of an embodiment of an adapter system for attaching a handheld weapon.
Figure 5:
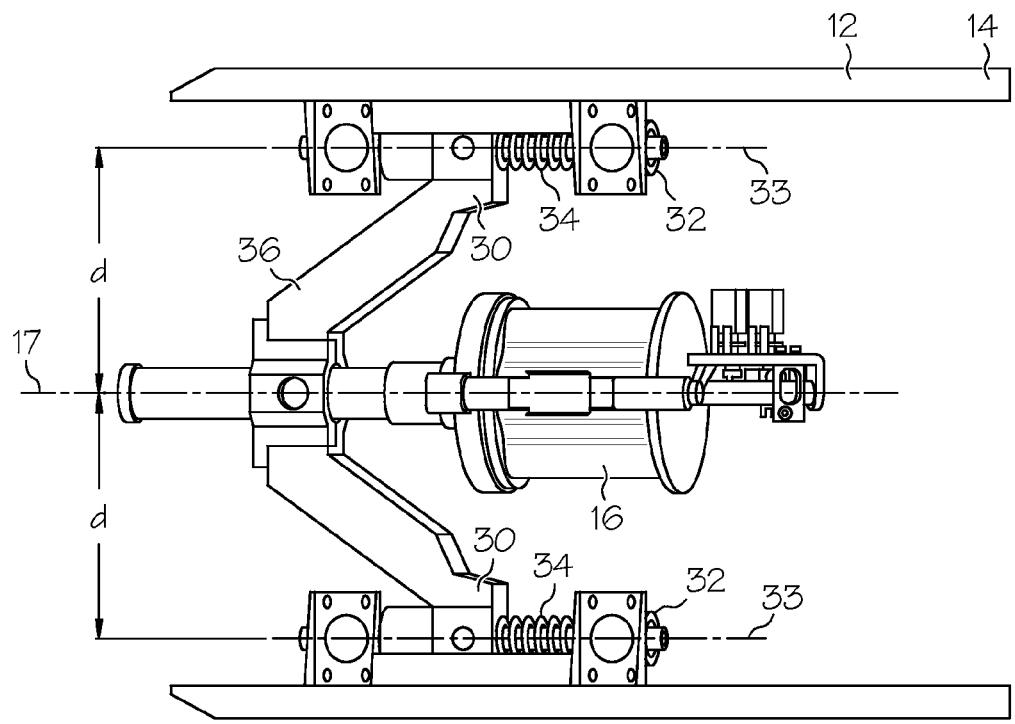
FIG. 5 shows a top view of an embodiment of an adapter system for attaching a handheld weapon.
Figure 6:
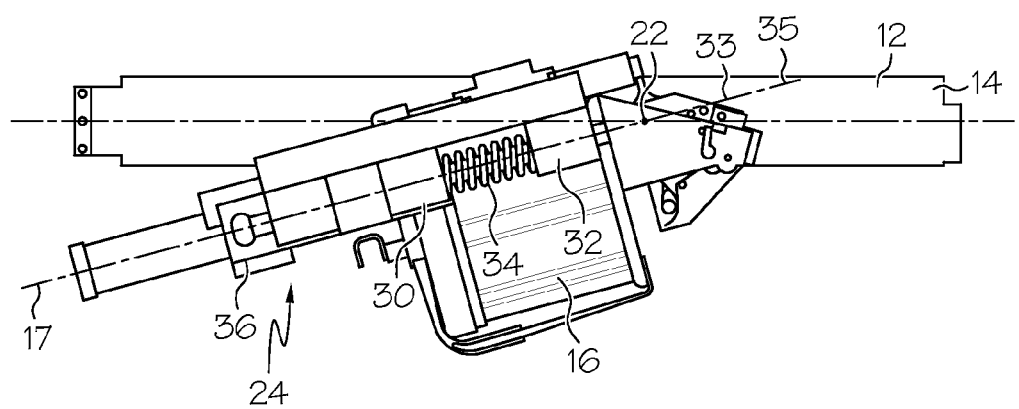
FIG. 6 shows a side view of an embodiment of an adapter system for attaching a handheld firearm.

FIGS. 4-6 show multiple views of an embodiment of an adapter 20. In some embodiments, the mounting assembly 24 comprises one or more recoil absorbing and/or isolating mechanisms 34, which allows the weapon 16 to move with respect to the UAV 10/12 upon firing. In some embodiments, the mounting assembly 24 comprises a first portion 30 that is moveable with respect to a second portion 32. In some embodiments, the first portion 30 is slidably engaged with the second portion 32. In some embodiments, the first portion 30 is attached to the weapon 16 and the second portion 32 is attached to the UAV 10/12. In some embodiments, the first portion 30 is slidably engaged with a pair of second portions 32. Each slidably engaged portion defines an axis of engagement 33 along which the first portion 30 travels with respect to the second portion 32. In some embodiments, each axis of engagement 33 is parallel to the barrel axis 17 of the weapon 16. In some embodiments, each axis of engagement 33 is located an equal distance d from the barrel axis 17. In some embodiments, the axes of engagement 33 and the barrel axis 17 are oriented in a common plane 35.

In some embodiments, the first portion 30 is configured to suspend the weapon 16 from the second portion 32 such that when the weapon 16 is fired, the recoil mechanism 34 absorbs at least a portion of the recoil forces. The second portion 32 is configured to support the first portion 30 and permit the first portion 30 to move or translate relative to the second portion 32.

In some embodiments, the mounting assembly 24 comprises a pair of recoil mechanisms 34, which are desirably symmetrical and located on opposite sides of the weapon 16.

In some embodiments, the mounting assembly 24 comprises a truss member 36 that supports the handheld firearm 16. In some embodiments, the truss member 36 is rigidly attached to a portion of the weapon 16, such as the barrel. Desirably, the truss member 36 is capable of transmitting moment forces. The truss member 36 can be made from any suitable material and is preferably as lightweight as possible. In some embodiments, the truss member 36 is machined from a piece of billet material, such as aluminum, providing a strong but lightweight component. In some embodiments, the truss member 36 is made of composites, plastics, metals or metal alloys, etc.

Figure 7:
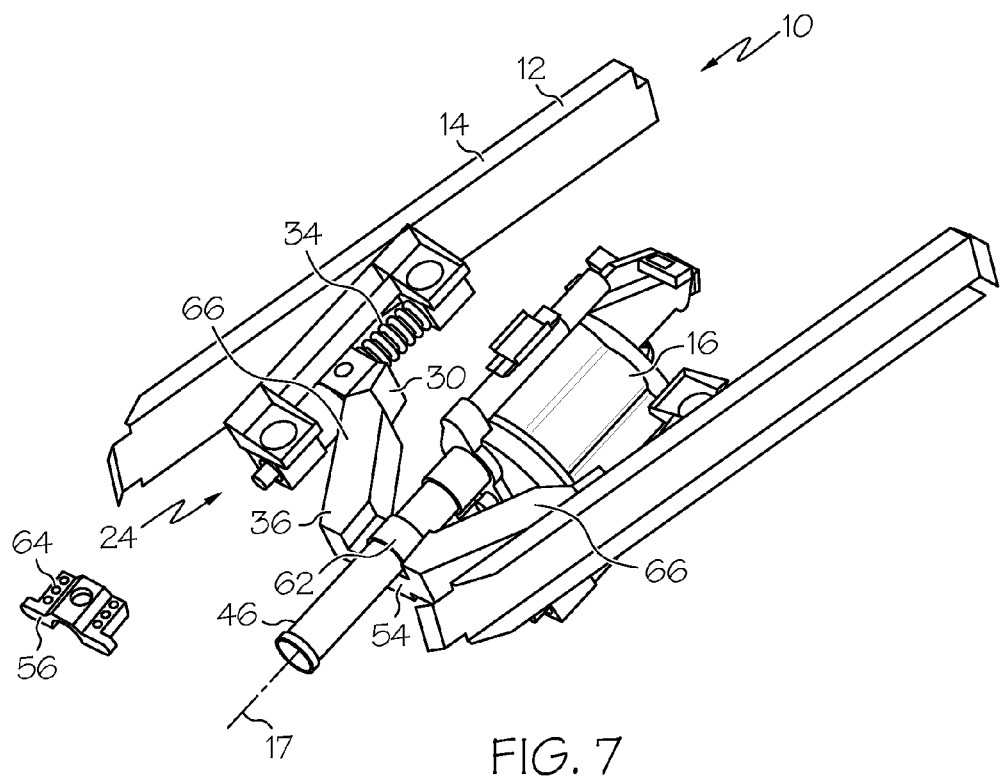
FIG. 7 shows an orthographic view of an embodiment of an adapter system for attaching a handheld firearm.

Referring to FIG. 7, in some embodiments, the truss member 36 comprises a fixturing portion 54 and a retainer 56. The fixturing portion 54 and retainer 56 are arranged to fixedly clamp the weapon 16 in place. Desirably, the retainer 56 can be removed, allowing the weapon 16 to be removed or exchanged without detaching other portions of the mounting assembly 24.

In some embodiments, the fixturing portion 54 and/or the retainer 56 are configured to engage a retaining mechanism/feature 62 of the weapon 16. In some embodiments, a portion of the weapon 16 can be provided with the retaining feature 62. For example, in some embodiments, a barrel 46 of the weapon comprises a raised hub 62. In some embodiments, the fixturing portion 54 and/or the retainer 56 comprise a cooperative retaining feature, such as a groove, which retains the retaining feature 62 of the weapon 16. In some embodiments, an existing handheld weapon suitable for use as the weapon 16 herein includes the retaining feature 62 as an OEM feature. Thus, the truss member 36 can be specifically designed to engage an existing handheld weapon without requiring modification to the weapon. Various embodiments of the truss member 36 can be designed to engage various types of existing handheld weapons.

In some embodiments, the truss member 36 comprises one or more interchangeable modular adapters. For example, multiple embodiments of a retainer 56 can each be configured to attach to a given truss member 36, wherein each embodiment of the retainer 56 is suitable to engage a different existing weapon.

In some embodiments, a truss member 36 can further comprise a separate adapter (not illustrated) that is configured to engage an embodiment of a fixturing portion 54 and retainer

56. For example, in some embodiments, a fixturing portion 54 and retainer 56 are configured to engage an M32 grenade launcher. The truss member 36 can further comprise an optional separate adapter that allows a smaller caliber weapon to be mounted. For example, a smaller caliber pistol could be mounted, wherein the adapter engages the pistol and the fixturing portion 54 and retainer 56 engage the adapter.

In some embodiments, the retainer 56 is configured to at least partially surround a portion of the weapon 16, such as the barrel 46 and/or the retaining mechanism 62. In some embodiments, the retainer 56 has a plurality of apertures 64, through which fasteners can be placed to engage the fixturing portion 54. Thus, the retainer 56 and the fixturing portion 54 act in conjunction to surround a portion of the weapon 16, such as the barrel 46, thereby fixedly mounting the weapon 16 to the UAV.

In some embodiments, the truss member 36 comprises a lobe or pair of lobes 66, and each lobe 66 is associated with a recoil mechanism 34.

Figure 8:
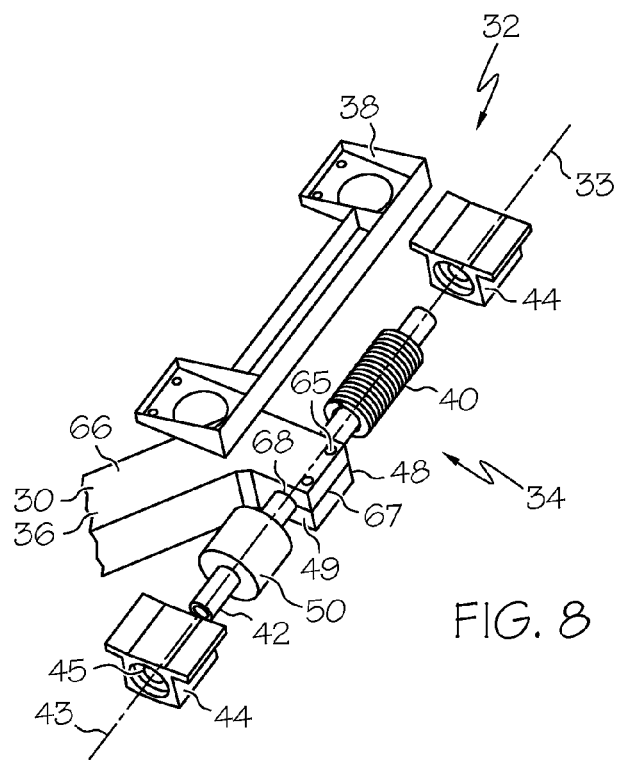
FIG. 8 shows an exploded view of an embodiment of a recoil isolation mechanism.

FIG. 8 shows an exploded view of an embodiment of a recoil mechanism 34. A portion of the truss member 36, such as a lobe 66, can be attached to a shaft 42. In some embodiments, the truss member 36 is fixedly attached to the shaft 42. For example, the truss member 36 can be formed with an aperture 68 and a slot 67, configured to clamp the shaft 42. In some embodiments, the aperture 68 and slot 67 are formed by removing material from the truss member 36. The truss member 36 further comprises one or more holes 65 configured to accept a fastener or bolt to tighten the truss member 36 to the shaft 42.

In some embodiments, the shaft 42 is configured to translocate with respect to the second portion 32 of the recoil isolation mechanism 34. In some embodiments, the second portion 32 comprises one or more housing members 44. The housing members 44 are slidably engaged with the shaft 42. In some embodiments, the housing members 44 comprise linear bearings or pillow blocks. The housings 44 support the shaft 42, preferably preventing movement in directions radial to the shaft central axis 43 while allowing movement along the shaft axis 43. In some embodiments, the shaft axis 43 is oriented parallel to the barrel axis 17 of the weapon 16. In some embodiments, the shaft axis is collinear with the axis of engagement 33.

In some embodiments, each housing 44 defines a cavity 45, which can be shaped to receive the shaft 42. Thus, a cross-sectional shape of the cavity 45 is preferably the same as a cross-sectional shape of the shaft 42. In some embodiments, a shaft 42 is circular in cross-section, which can allow some rotational movement between the shaft 42 and the housing 44, for example if the UAV flexes in torsion and the mounting rails 14 move with respect to one another. In some embodiments, the shafts 42 are non-circular in cross-section, for example being polygonal, which can increase structural rigidity of the UAV 10.

In some embodiments, the housing(s) 44 are attached to the UAV structure 12. In some embodiments, the second portion 32 of the recoil mechanism 34 further comprises one or more support brackets 38, wherein each support bracket 38 is attached to the UAV structure 12, and the housing 44 is attached to the support bracket 38. A support bracket 38 allows for the recoil mechanism 34 to be more easily removed from the UAV 10 (e.g. for servicing), and to the easily reinstalled in the proper position.

In some embodiments, the recoil mechanism 34 comprises one or more biasing members 40. The recoil mechanism 34 is configured to damp the shock or recoil that results from firing the weapon 16, and can retard and diminish force transfer from the weapon 16 to the UAV structure 12. The biasing member 40 is preferably positioned to absorb energy as the first portion 30 of the recoil mechanism 34 translocates from a nominal orientation (e.g. an at rest position, for example as shown in FIG. 7) to a recoiling orientation. Absorbing recoil in the biasing member 40 is desirable because the supporting structure 12 of the UAV 10 is insulated from the sudden shock associated with firing the weapon 16, which aids in stability. The biasing member 40 stores energy until the recoil forces from the firing impulse diminish, for example over a duration of 0.01 seconds or less, and the stored energy is used to move the weapon 16 back to the at rest position. In some embodiments, the biasing member 40 is located between the first portion 30 and the second portion 32 of the recoil mechanism 34. In some embodiments, the biasing member 40 comprises a compression spring. In some embodiments, a spring comprises a helical spring that is wound around a shaft 42.

The first portion 30 of the recoil mechanism 34 can define a recoil side 48 and a rebound side 49. The first portion 30 generally moves in the direction of the recoil side 48 as the weapon 16 and first portion 30 translocate due to initial recoil. The first portion 30 then moves generally in the direction of the rebound side 49 as it rebounds back to the nominal orientation. In some embodiments, a biasing member 40 comprises a compression member and is located to the recoil side 49 of the first portion 30. As shown in FIG. 8, the biasing member 40 is a compression spring located between the rebound side 49 of the first portion 30 and a housing 44 of the second portion 32. In some embodiments, a biasing member 40 comprises a tension member and is located to the rebound side 48 of the first portion 30, for example being attached between the first portion 30 and second portion 32. In some embodiments, a biasing member 40 is capable of functioning as both a tension member and a compression member, for example if the first portion 30 recoils and rebounds back past the nominal orientation.

In some embodiments, the recoil isolation mechanism 34 further comprises a damper 50 or bumper. In some embodiments, the damper 50 is disposed between the first portion 30 and a portion of the second portion 32, such as a housing 44 located opposite the biasing member 40. As illustrated in FIG. 8, the damper 50 is oriented to absorb shock from the first portion 30 as the first portion 30 rebounds back to the nominal orientation and/or past the nominal orientation. In some embodiments, it is preferable to use a damper 50 in addition to the biasing member 40, for example when the biasing member 40 is configured to only function as a compression member. In some embodiments, the biasing member 40 is loaded with a predetermined amount of compression in the at rest orientation, and the damper 50 can experience similar compressive forces. In some embodiments, the damper 50 functions as a secondary biasing member oriented to damp any impact between the first portion 30 and the rebound side 49 housing 44. In some embodiments, the damper 50 comprises a resilient material, such as an elastomeric material. In some embodiments, the initial recoil forces of the weapon 16 can impart a pitch, yaw or roll motion to the UAV, for example when the barrel axis 17 is offset slightly from the UAV center of mass 22 (see FIG. 6). Such motion is generally counteracted when the first portion 30 of the mounting assembly 24 rebounds against the damper 50 as the weapon 16 returns to the at rest orientation.

In various embodiments, the biasing member 40 can comprise any mechanism suitable for functioning as a biasing member/mechanism 40. For example, in some embodiments, an air or gas spring is used, such as a sealed device wherein positive and/or negative gas pressure provides biasing forces.

In some embodiments, a hydraulic or other fluid resistance device is used. In some embodiments, a fluid resistance device comprises a non-Newtonian fluid. In some embodiments, a magnetic resistance device using permanent and/or electromagnets can provide biasing forces.

In alternative embodiments of the recoil mechanism 34, a shaft 42 comprises the second portion 32 of the recoil mechanism 34. For example, in some embodiments, the shaft 42 is fixedly attached to a housing 44, a support bracket 38, or a portion of the UAV structure 12. The first portion 30, such as the truss member 36, is slidably engaged with the shaft 42, configured to slide in the direction of the shaft axis 43.

Figure 9:
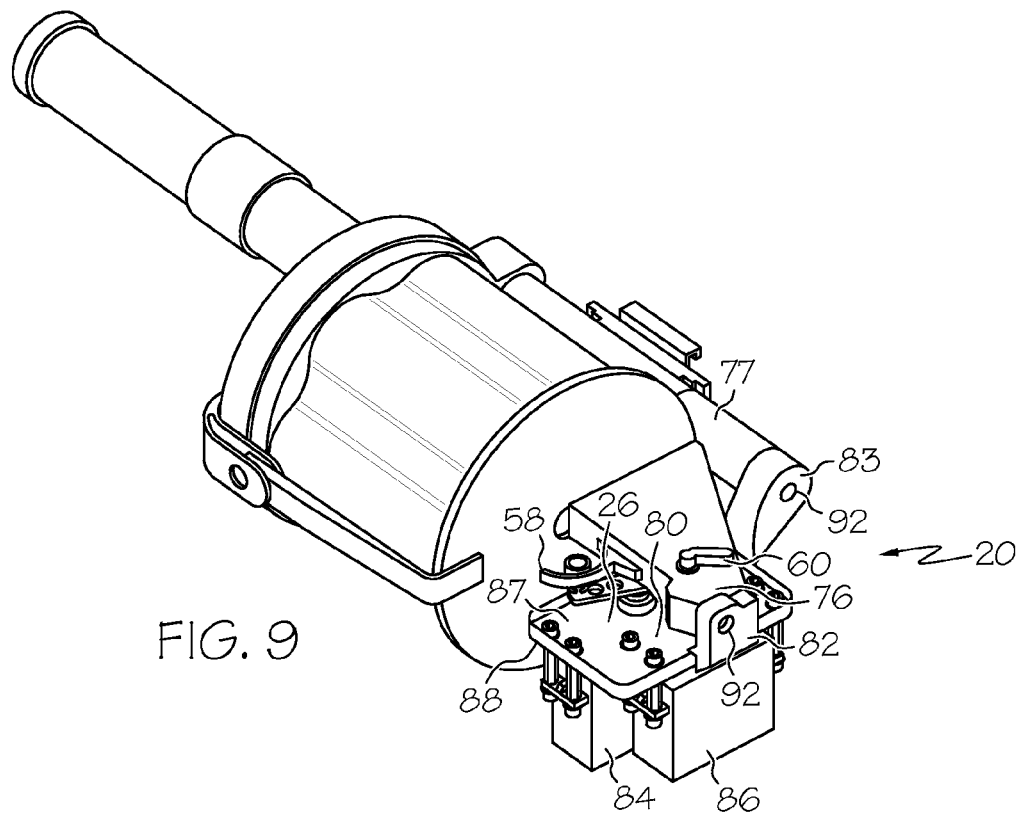
FIG. 9 shows an orthographic view of a handheld weapon and an embodiment of an actuation assembly.

FIG. 9 shows an embodiment of an actuation assembly 26 attached to a weapon 16. In some embodiments, the UAV weapon adapter 20 comprises an actuation assembly 26 configured to actuate a trigger 58 of the weapon 16. In some embodiments, the actuation assembly 26 is affixed to the weapon 16, and therefore travels with the weapon, for example as the weapon 16 recoils. This allows the actuation assembly 26 to fire the weapon 16 at any time.

In some embodiments, the actuation assembly 26 comprises a body member 80 and a first actuation device 84. In some embodiments, the actuation assembly 26 is configured to operate a safety mechanism 60 of the weapon 16, and comprises a second actuation device 86. In some embodiments, the body member 80 supports the first actuation device 84 and the second actuation device 86.

In some embodiments, the body member 80 comprises mounting brackets 82, 83 that allow attachment to the weapon 16. For example, a first mounting bracket 82 allows engagement with a butt section 76 of the weapon 16. A second mounting bracket 83 is configured to engage a second mounting section 77 of the weapon 16. Each mounting bracket 82, 83 comprises a hole 92, through which a fastener is preferably disposed to engage the weapon 16.

In alternative embodiments, the body member 80 can be otherwise configured to engage the weapon 16, for example using clamps, quick release locks, or the like.

In some embodiments, the weapon 16 is mounted on a first side 87 of the body member 80, and is secured to the body member 80 by a first mounting bracket 82. The first and second actuation devices 84, 86 are mounted to a second side 88 of the body member 80, and are configured to extend through the body member 80 to engage the respective trigger 58 and safety mechanism 60 of the weapon 16.

Figure 10:
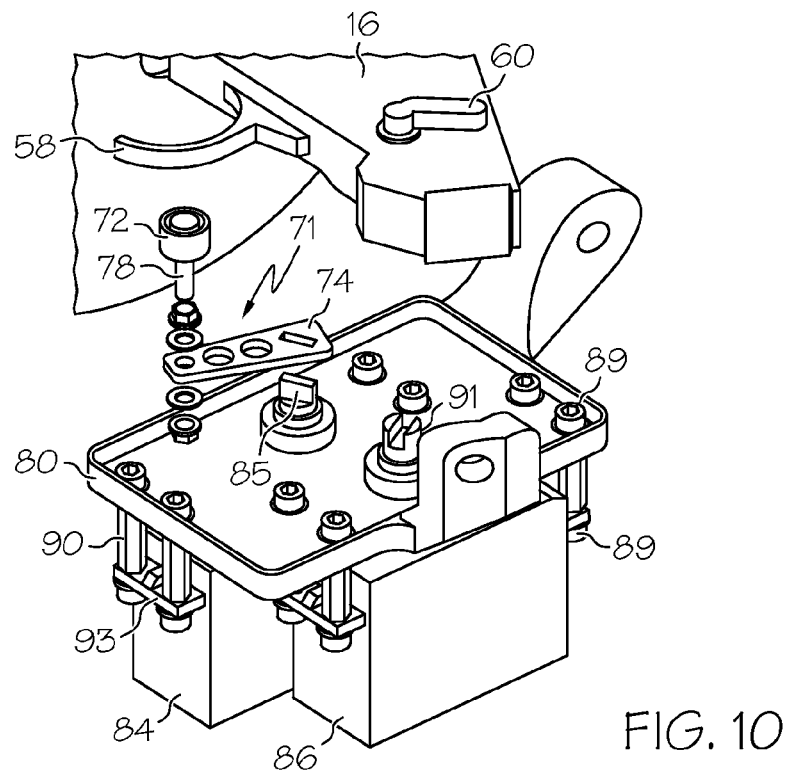
FIG. 10 shows an exploded view of an embodiment of an actuation assembly.

FIG. 10 shows the weapon 16 disengaged from the body member 80, and an exploded view of an embodiment of a trigger actuation mechanism 71, which links the first actuation device 84 to the trigger 58.

In some embodiments, the first and second actuation devices 84, 86 each comprise a servo motor. In some embodiments, a servo motor comprises a lightweight, high-torque servo motor such as a Futaba S3306 ⅕ scale motor available from Futaba Radio Control Systems. In some embodiments, the first and second actuation devices 84, 86 comprise the same type of motor. In some embodiments, the first and second actuation devices 84, 86 comprise different types of motors, for example being individually selected according to the torque necessary to operate the trigger 58 or the safety 60.

In some embodiments, the first and second actuation devices 84, 86 are attached to the body member 80 via with fasteners 89, such as complimentary bolts and tube nuts. In some embodiments, the actuation devices 84, 86 are prefabricated and are provided with mounting tabs 93. In some embodiments, a spacer 90, such as a stand-off tube, is used with a fastener 89. A spacer 90 allows the fasteners 89 to be properly tightened without risk of damaging or breaking off the mounting tabs 93.

The trigger actuation mechanism 71 is oriented to transmit force from the first actuation device 84 to the trigger 58. The trigger actuation mechanism 71 desirably moves in accordance with the movement of the trigger 58. In some embodiments, the trigger actuation mechanism 71 comprises an actuation lever 74 that engages the first actuation device 84. For example, the actuation lever 74 can engage an output shaft 85 of a servo motor. The trigger actuation mechanism 71 further comprises a trigger engaging portion 72 configured to actuate the trigger 58. In some embodiments, the trigger engaging portion 72 comprises a roller, which is preferable when the trigger 58 comprises curvature. A roller is desirably capable of rolling along the trigger 58 as the trigger 58 and the actuation lever 74 move during actuation. In some embodiments, the trigger engaging portion 72 is rotatably engaged with the actuation lever 74 or a shaft 78 attached to the actuation lever 74. In some embodiments, a shaft 78 can be secured to the actuation lever 74 with fasteners, such as a plurality of nuts and washers.

In some embodiments, the second actuation device 86 is coupled to the safety mechanism 60 of the weapon 16. Thus, the second actuation device 86 is capable of operating the safety 60, including both engaging the safety 60 to prevent fire and defeating the safety 60 to allow fire. In some embodiments, an output portion 91 or shaft of the second actuation device 86 is shaped/configured to engage an existing portion of a safety mechanism 60 of an OEM weapon, without modification to the safety mechanism 60.

In various embodiments, the actuation devices 84, 86 comprise any actuation mechanism suitable for accomplishing its task as described herein. For example, any suitable rotational motor can be used, such as a stepping motor, servo motor, and the like. Further, in some embodiments, a linear actuation mechanism can be used for either actuation device 84, 86. Various actuation devices 84, 86 can be selected according to the specifics of the weapon 16 being used. In some embodiments, the first actuation device 84 comprises a different type of actuation mechanism than the second actuation device 86. For example, in some embodiments, the first actuation device 84 comprises a linear actuator and the second actuation device 86 comprises a rotational actuator.

Figure 11:
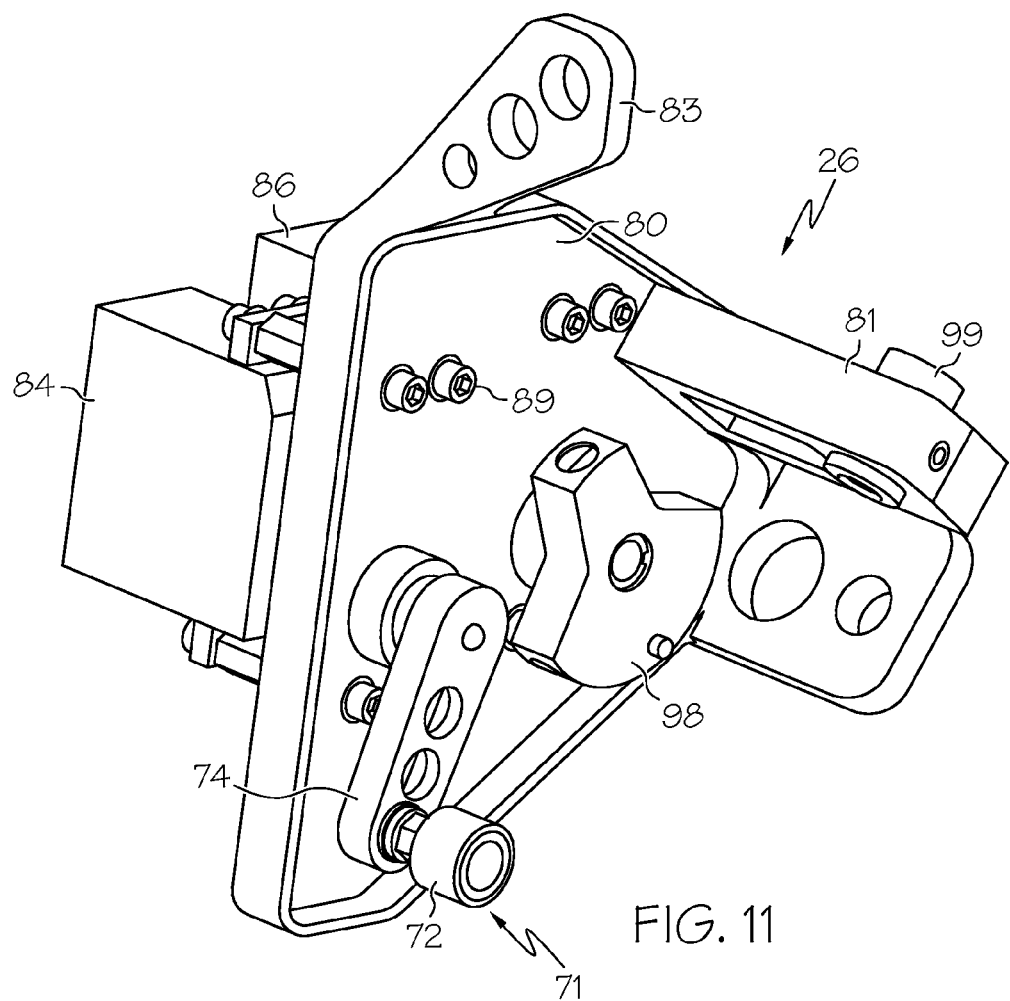
FIG. 11 shows an orthographic view of an embodiment of an actuation assembly.

FIG. 11 shows another embodiment of an actuation assembly 26. In some embodiments, the actuation assembly 26 comprises a releasable link coupling 98 between the second actuation device 68 and the safety mechanism 60 of the weapon 16. The releasable link coupling 98 allows for manual operation of the safety mechanism 60 without use of the second actuation device 68, for example by a service technician, without any risk of damage to the second actuation device 68. An embodiment of a releasable link coupling 98 is discussed in detail below.

In some embodiments, an actuation assembly 26 comprises a safety locking mechanism 99 configured to lock the safety mechanism 60 of the weapon 16 in a safe/no-fire orientation. For example, a service technician may engage the safety locking mechanism 99 during servicing of the weapon 16 to guarantee that the weapon 16 will not fire. In some embodiments, the body member 80 of the actuation assembly 26 comprises an extension portion 81. In some embodiments, the safety locking mechanism 99 is mounted to the extension portion 81, and extends through the extension portion 81.

Figure 12:
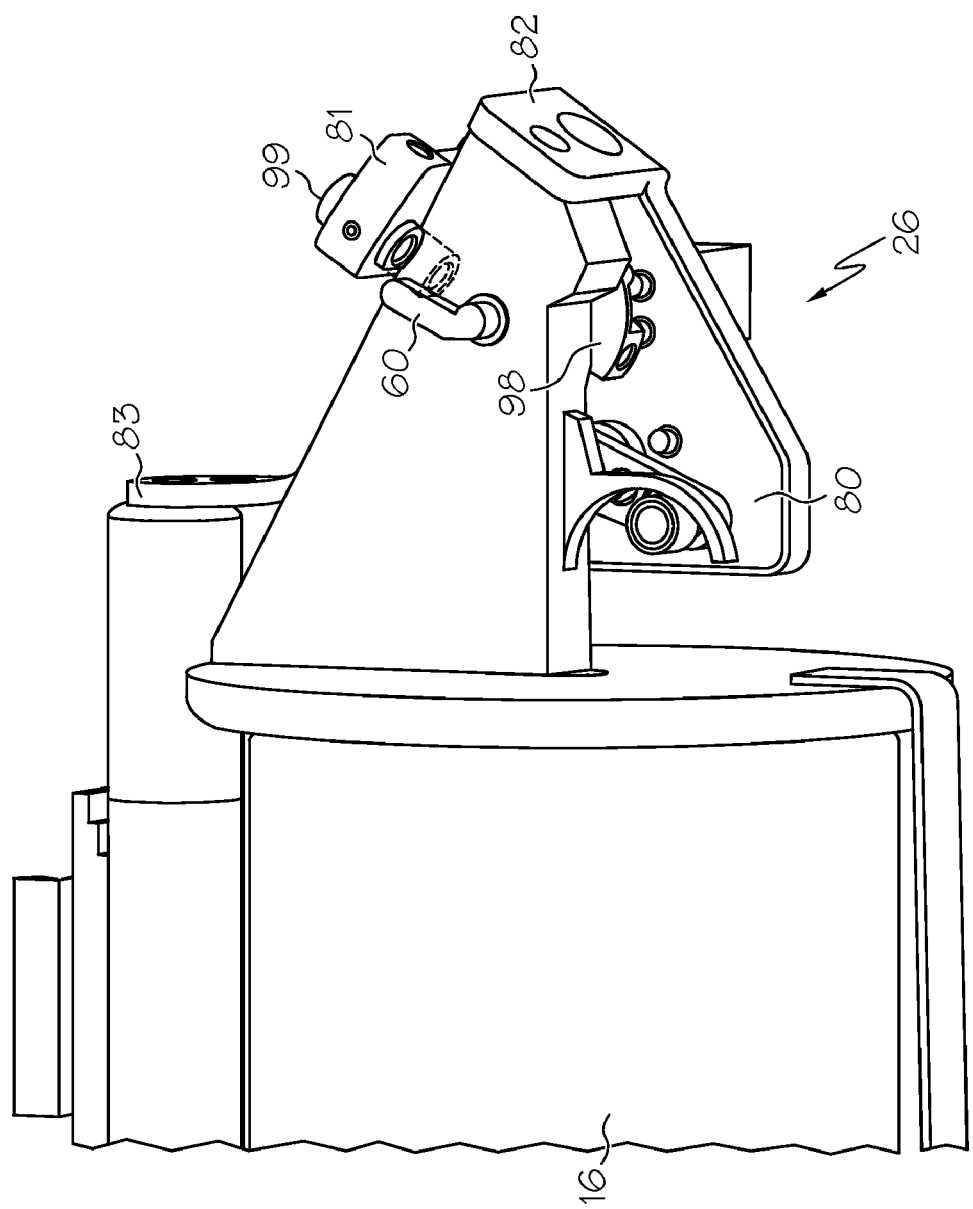
FIG. 12 shows another view of an embodiment of an actuation assembly.

FIG. 12 shows an embodiment of an actuation assembly 26 engaged with a weapon 16. The safety 60 of the weapon 16 is coupled to the second actuation device 86 via an embodiment of a releasable link coupling 98.

In some embodiments, a safety locking mechanism 99 is moveable between first and second positions. In a first position, the safety locking mechanism 99 does not interfere with operation of the safety mechanism 60. Thus, the safety mechanism 60 can be engaged and/or disengaged, for example manually or by the second actuation device 86. In the second position, the safety locking mechanism 99 is positioned to interfere with the safety mechanism 60, locking the safety mechanism 60 in a safe/no-fire orientation. If the second actuation device 86 actuates to move the safety 60 to a fire orientation when the safety locking mechanism 99 is in the second/interference position, the releasable link coupling 98 will disengage, and the safety 60 will not be de-activated. In some embodiments, the safety locking mechanism 99 comprises detents that encourage the safety locking mechanism 99 to assume the first or second position.

Figure 13:
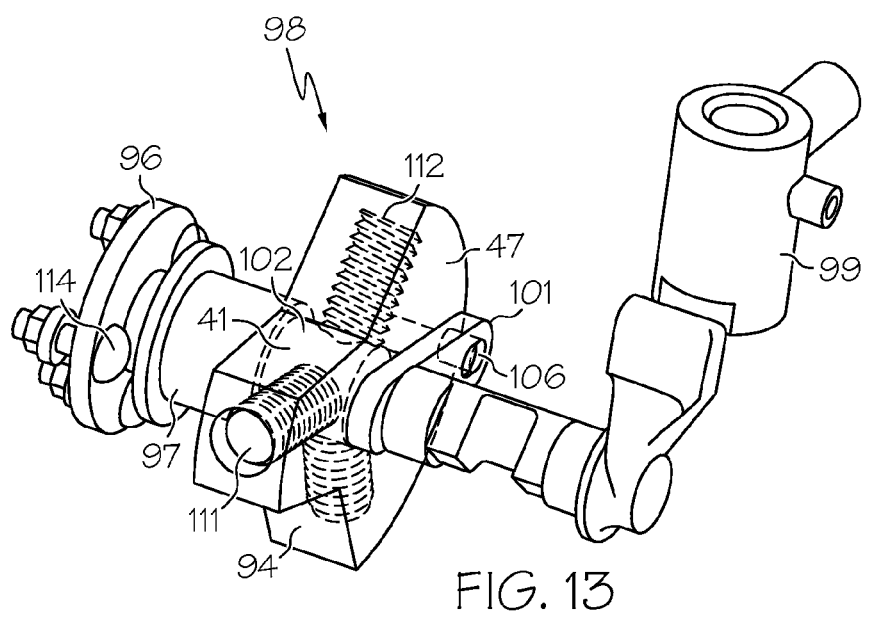
FIG. 13 shows an embodiment of a safety coupling for an embodiment of an actuation assembly.
Figure 14:
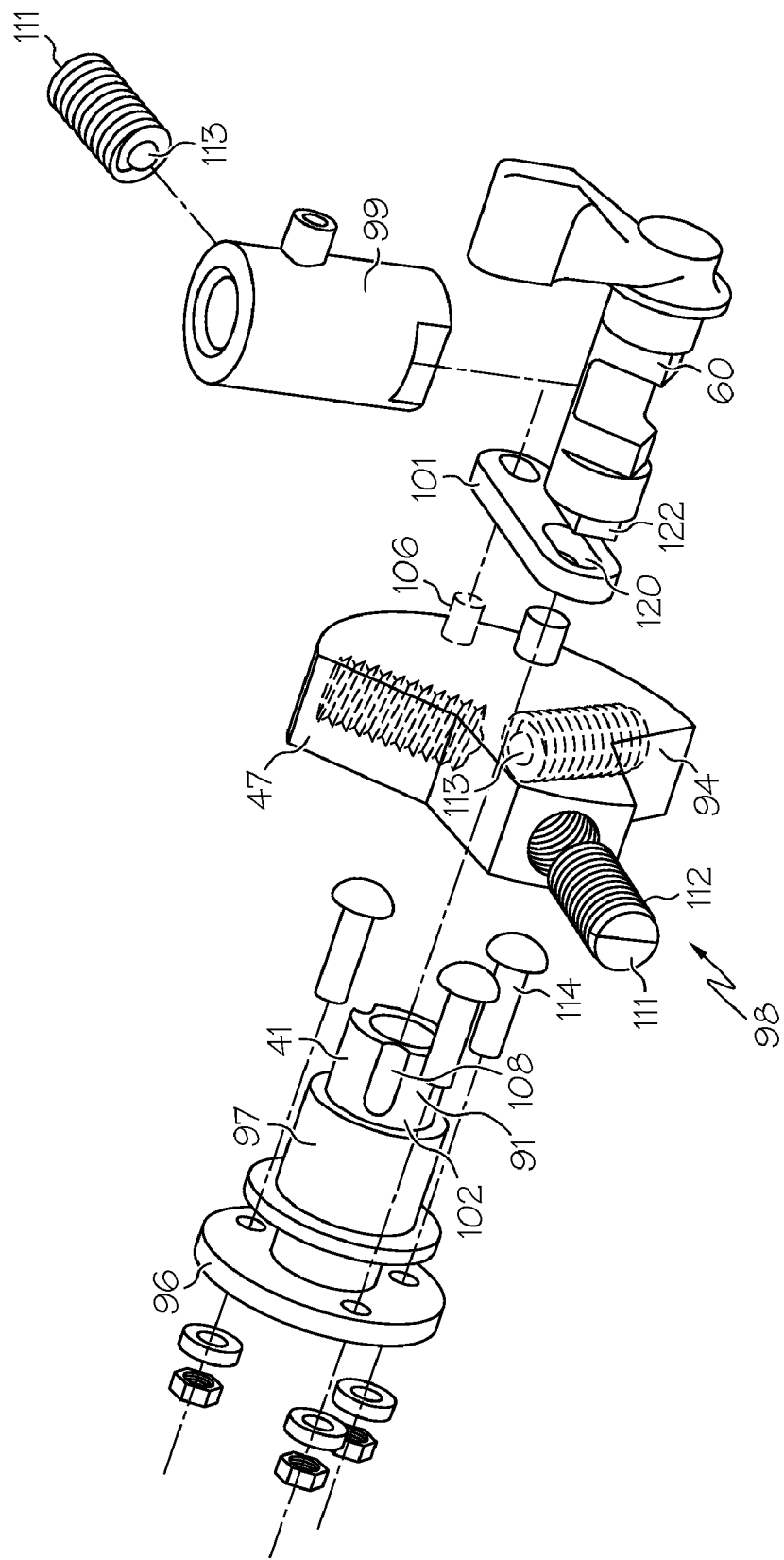
FIG. 14 shows an exploded view of an embodiment of a safety coupling for an embodiment of an actuation assembly.

FIG. 13 shows an embodiment of a releasable link coupling 98. FIG. 14 shows an exploded view of an embodiment of the releasable link coupling 98. In some embodiments, the releasable link coupling 98 comprises a first portion 41 releasably couples with a second portion 47. The first portion 41 is attached to an output portion/shaft the second actuation device 86, and the second portion 47 is attached to the safety mechanism 60 of the weapon 16. The releasable link coupling 98 is preferably capable of transmitting a predetermined amount of torque between the first portion 41 and second portion 47, and will release if an more than the predetermined amount is attempted to be transferred. For example, the releasable link coupling 98 will release if the safety mechanism 60 is manually operated without actuation of the second actuation device 86, and/or if the second actuation device 86 is actuated when the safety mechanism 60 is unable to move, for example due to a safety locking mechanism 99.

In some embodiments, the first portion 41 of the releasable link coupling 98 comprises a spindle 102 that is engaged to the second actuation device 86. In some embodiments, a spindle 102 comprises a second actuation output 91. In some embodiments, an adapter 96 is used between the second actuation device 86 and the spindle 102. In some embodiments, an adapter 96 can be used to attach the spindle 102 to an output of a servo motor, for example using fasteners 114 or any other suitable attachment method. In some embodiments, a sleeve 97 is oriented about a portion of the spindle 102. A sleeve 97 can be used to center the spindle 102 as it passes through an aperture in the body member 80 of the actuation assembly 26. In some embodiments, a sleeve 97 comprises a bushing. In some embodiments, the sleeve 97 is stationary relative to the body member 80, while the spindle 102 rotates relative to the sleeve 97. In some embodiments, the sleeve 97 is friction fit on the spindle 102 and rotates with the spindle 102. In some embodiments, a sleeve 97 is formed from a low friction material. In some embodiments, a sleeve 97 functions as a vibration damping/insulating member.

In some embodiments, the spindle 102 comprises a plurality of slots 108 or grooves, which extend into an outer surface of the spindle 102. As shown in FIG. 14, the spindle 102 comprises three (3) slots 108, which are evenly distributed about the outer circumference of the spindle 102. In some embodiments, the slots 108 collectively comprise a detent that the second portion 47 of the releasable link coupling 98 engages.

In some embodiments, the second portion 47 of the releasable link coupling 98 comprises one or more engaging members 112 arranged to engage the first portion 41. In some embodiments, an engaging member 112 comprises a ball locking mechanism 111. For example, as shown in FIG. 14, each ball locking mechanism 111 engages a slot 108 in the spindle 102. In some embodiments, ball locking mechanism 111 comprises a threaded body and a ball bearing 113 disposed at an end of the ball locking mechanism 111. A spring (not illustrated) located within the threaded body biases the ball 113 in an outward direction, and the ball 113 can move into the threaded body upon the application of an inward force. Each ball locking mechanism 111 is threaded into a coupler body 94 of the second portion 47. Thus, the ball locking mechanisms 111 shown in FIG. 14 each engage a slot 108 in the spindle, thereby engaging the first portion 41 with the second portion 47. If the first portion 41 and second portion 47 are turned against one another with enough force to overcome the ball locking mechanisms 111, the balls 113 move out of the slots 108, decoupling the first portion 41 from the second portion 47. As the slots 108 are rotated back into alignment with the ball locking mechanisms 111, the first portion 41 and second portion 47 reengage. In some embodiments, a slot 108 comprises an arcuate or semi-circular cross-sectional shape. In some embodiments, a cross-sectional shape of the slot 108 is shaped to cooperatively engage a portion of a ball locking mechanism 111.

In some embodiments, the coupler body 94 comprises a shaped body portion that provides an aperture for each engaging member 112. In some embodiments, the releasable link coupling 98 further comprises a link member 101 attached between the coupler body 94 and the safety mechanism 60 of the weapon 16. The link member 101 transmits the rotational motion of the coupler body 94 to the safety mechanism 60. In some embodiments, the link member 101 comprises a shaped aperture 120 that engages a shaped protrusion 122 on the safety 60. The engagement between the shaped aperture 120 and the shaped protrusion 122 preferably transmits a greater amount of torque than can be transmitted between the first portion 41 and second portion 47 of the releasable link coupling 98. In some embodiments, the shaped aperture 120 is shaped to engage a protrusion 122 that exists in the safety mechanism 60 of an OEM weapon 16 without modification.

In some embodiments, the coupler body 94 further comprises or is arranged to engage a transfer pin 106. The transfer pin 106 is offset from a central axis of the spindle 102. In some embodiments, the transfer pin 106 engages the link member 101, thereby transmitting torque to the link member 101 and safety mechanism 60.

FIG. 13 also shows an embodiment of a safety locking mechanism 99 oriented in an interference position, wherein the safety mechanism 60 is locked in a safe orientation. As shown in FIG. 14, a detent mechanism can be used that encourages the safety locking mechanism 99 to be positioned in either the first position or the second position. For example, a ball locking mechanism 111 can be used to engage the safety locking mechanism 99. In some embodiments, a ball locking mechanism 111 can be received in the extension portion 81 (see FIG. 11) of the body member 80, positioned such that the ball 113 engages a detent slot, groove or depression in the safety locking mechanism 99.

Figure 15:
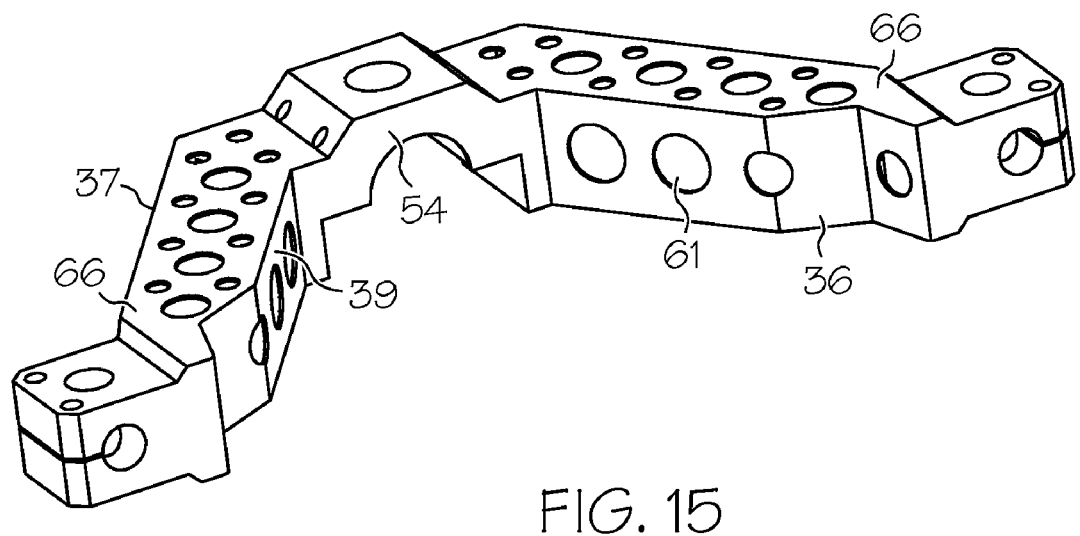
FIGS. 15 and 16 show views of an embodiment of a mounting assembly.
Figure 16:
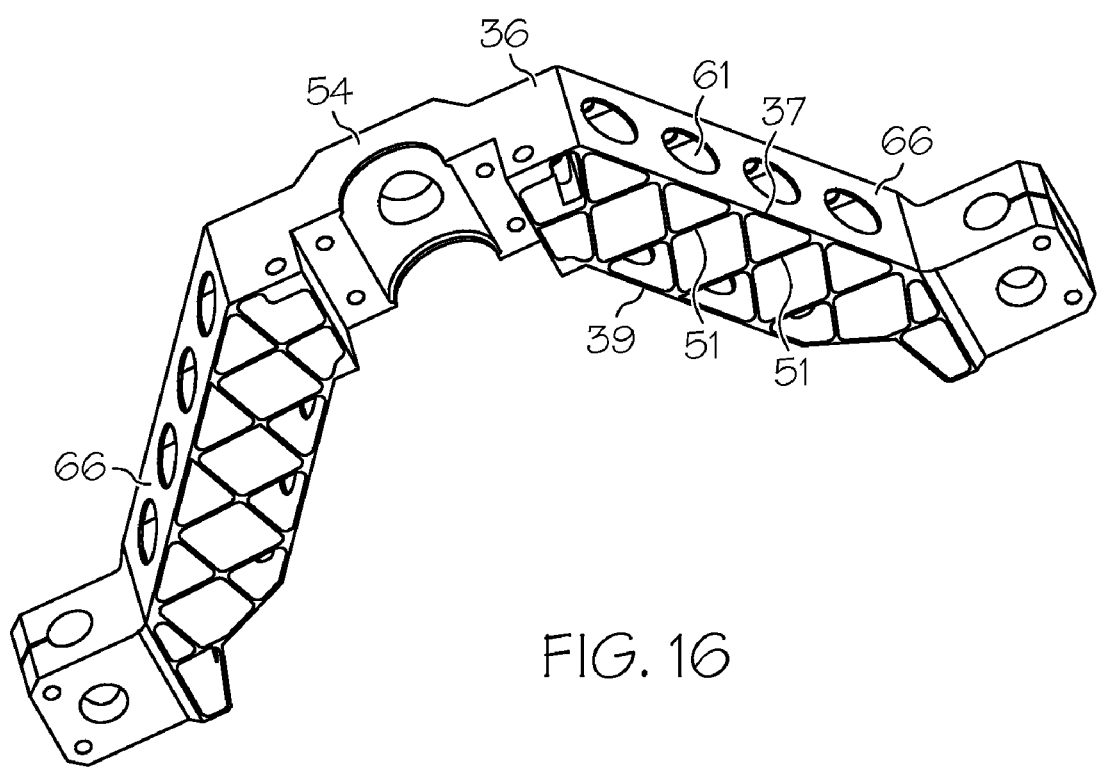

FIGS. 15 and 16 illustrate different views of an embodiment of a truss member 36. The truss member 36 preferably comprises a three-dimensional truss capable of transmitting tension, compression and moment forces between the weapon support/fixturing portion 54 and the outer portions of the lobes 66, which transmit forces to other portions of the mounting assembly 24 and/or the UAV. In some embodiments, the truss member 36 comprises opposed wall portions 37, 39 and a plurality of cross-linking members 51. Various cross-linking members can be oriented orthogonally with respect to one another. In some embodiments, the truss member 36 comprises a plurality of apertures 61, for example to save weight.

In some embodiments, the UAV is controlled remotely. Thus, an operator inputs flight and weapon commands into a control box, which is generally located on the ground. Flight and weapon commands are transmitted wirelessly to the UAV.

Figure 17:
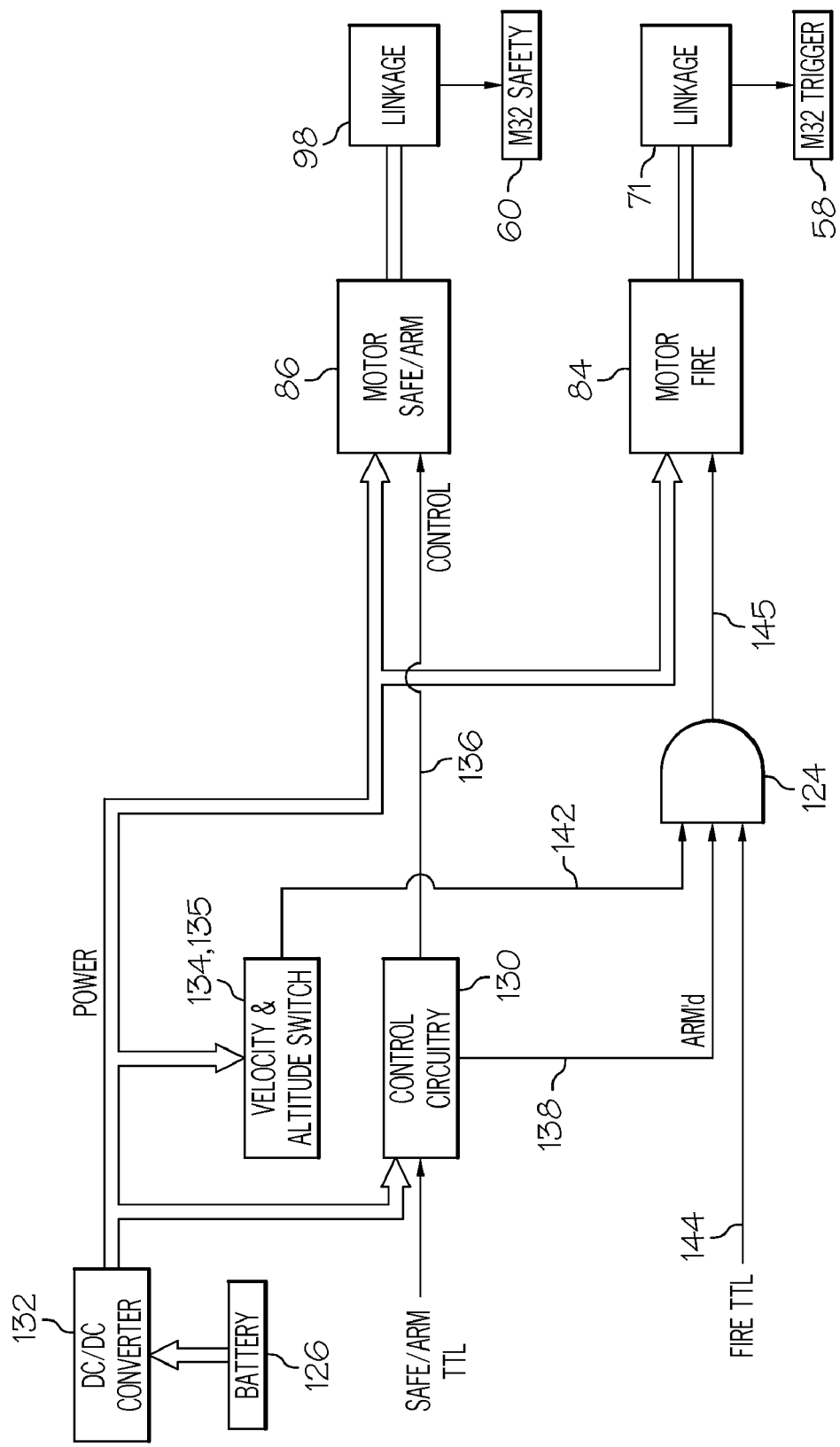
FIG. 17 shows an embodiment of a logic diagram for a control and actuation assembly.

FIG. 17 shows an embodiment of a logic flow diagram and components located in the UAV, which interpret and accomplish the commands received from the ground control box. A power source 126 supplies power to control circuitry 130, actuation mechanisms 84, 86 and any other equipment that requires power. In some embodiments, a power converter 132 is used, for example when the circuitry and/or actuation mechanisms 84, 86 require a different voltage than is provided by the power source 126. The control circuitry 130 receives commands pertinent to the safety mechanism 60 of the weapon 16. The control circuitry 130 outputs a safety command 136 to the second actuation device 86, for example engaging or disengaging the safety mechanism 60. When the safety mechanism 60 is disabled and the weapon can fire, the control circuitry 130 outputs an armed signal to an arming mechanism 124. In some embodiments, an altitude sensor 134 and/or a velocity sensor 135 are provided as a safety mechanism, which guarantee that the UAV has reached a predetermined altitude and/or airspeed prior to allowing the weapon to fire. When the UAV is above the predetermined altitude and/or airspeed, the altitude sensor 134 and/or velocity sensor 135 output an appropriate signal 142 to the arming mechanism 124. When a fire command is received from the ground control box, a fire signal 144 is transmitted to the arming mechanism 124. If the appropriate armed signal 138 and altitude/velocity signal 142 are also received, the arming mechanism 124 outputs a fire command 145 to the first actuation mechanism 84, thereby firing the weapon.

Figure 18:
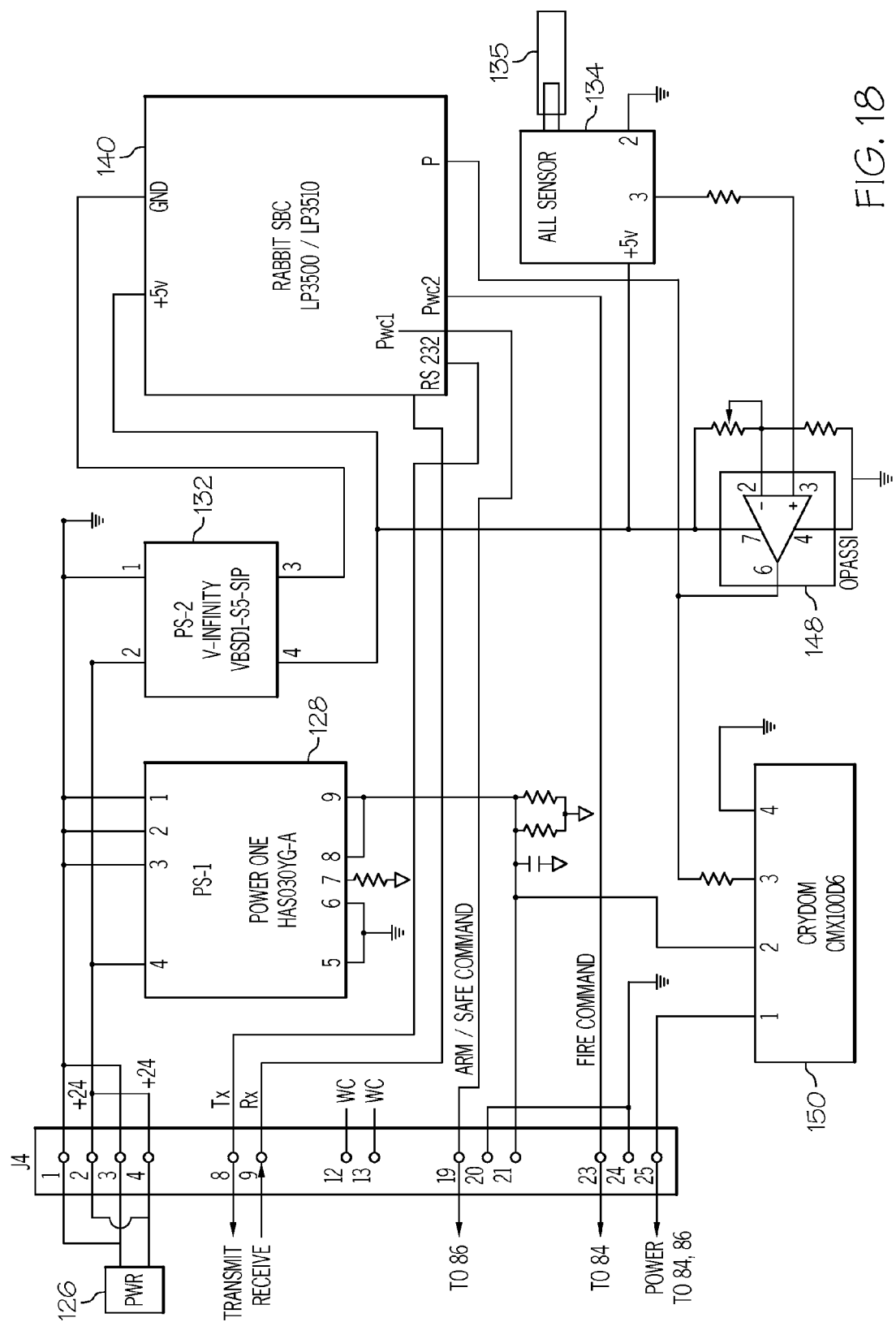
FIG. 18 shows an electrical schematic for an embodiment of a control system for the weapon.

FIG. 18 shows an electrical schematic for an embodiment of an actuation assembly 26. In some embodiments, the parts shown in the schematic are included on a circuit board attached to the body member 80 of the actuation assembly 26. In some embodiments, a circuit board is attached to another portion of the UAV, and appropriate connections are made between the illustrated parts.

FIG. 18 shows a terminal assembly J4, which in some embodiments comprises the main connector for the circuit board. Pins 1 and 3 comprise ground connections and pins 2 and 4 comprise positive power connections, for example being attached to a power source 126. In some embodiments, the circuit comprises a power converter 128, such as a DC-DC converter that converts the voltage received from the source 126 to a level suitable for other components of the circuit. For example, in some embodiments, a circuit computer 140, safety sensors 134, 135 and actuation devices 84, 86 receive a down-converted 5 volt supply, whereas other electronics in the UAV receive 24 volts from the source 126. In some embodiments, the power converter 128 comprises a power conditioner, which provides a clean supply of power to the circuit and isolates the circuit from other components that receive power from a common power supply. In some embodiments, the power converter 128 comprises a model HAS030YG-A HAS series DC-DC converter, available from Power One (http://www.power-one.com/).

In some embodiments, the circuit comprises a second power converter 132, which regulates and isolates power delivered to certain portions of the circuit, such as the computer 140, from other portions of the circuit, such as output to the actuation devices 83, 86. In some embodiments, the second power converter 132 comprises a model VBSD1-S5-S5-SIP available from V-Infinity, 10050 SW 112$^{th}$ Ave., Tualatin, Oreg. 97062 (www.cui.com).

Pin 9 of the terminal assembly J4 comprises a receive channel Rx that receives commands from the ground control box, such as safety mechanism engaging/disengaging commands and a weapon fire command, and sends the commands to the computer 140. Pin 8 of the terminal assembly J4 comprises a transmit channel Tx, which relays status information from the computer 140 back to the ground control box. In various embodiments, status information includes the status of any and all mechanisms in the circuit. In some embodiments, the receive channel Rx and transmit channel Tx are carried over an RS232 connection.

The computer 140 comprises a first pulse waveform output channel PWC1, which communicates with the second actuation mechanism 86 over pin 19 of the terminal assembly J4. Thus, the first pulse waveform output channel PWC1 controls the second actuation mechanism 86 and therefore the safety mechanism 60 of the weapon 16. When the computer 140 receives a safety mechanism 60 engage/disengage command via the receive channel Rx, it outputs an appropriate pulse waveform command via PWC1. In some embodiments, the computer 140 comprises a model LP3500 Low-Power Single-Board Computer microprocessor available from Rabbit Semiconductor, 2900 Spafford Street, Davis, Calif. 95618 (http://www.rabbit.com).

In some embodiments, the circuit comprises various safety circuits that much be satisfied prior to providing power to the first actuation device 84, or to both actuation devices 84, 86. In some embodiments, the safety circuits include an altitude sensor 134, which only allows weapon firing over a predetermined altitude. In some embodiments, the safety circuits include an airspeed sensor 135, such as a positive pressure device that uses pressure provided by forward motion to output a variable voltage. In some embodiments, an output of the airspeed sensor 135 is provided to an operational amplifier 148, which provides a voltage to a relay 150 only after an appropriate voltage corresponding to a predetermined minimum airspeed is received. When the relay 150 receives the voltage/arming signal from the op amp 148, it provides power to the first actuation device 84, or to both actuation devices 84, 86 via pin 25 of the terminal assembly J4. In some embodiments, the relay 150 comprises a model CMX100D6 solid-state MOSFET relay available from Crydom, Inc., 2320 Paseo de las Americas, Suite 201 San Diego, Calif. 92154 (http://www.crydom.com).

In some embodiments, the output voltage of the op amp 148 is also provided to the computer 140, which verifies that the safety circuitry requirements have been satisfied prior to sending a weapon fire signal. The computer 140 comprises a second pulse waveform output channel PWC2, which communicates with the first actuation mechanism 84 over pin 23 of the terminal assembly J4. Thus, the second pulse waveform output channel PWC2 controls the first actuation mechanism 84 and therefore the trigger 58 of the weapon 16. When the computer 140 receives a weapon fire command via the receive channel Rx, and a safety circuit signal from the op amp 148, it outputs an appropriate pulse waveform command via PWC2.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An adapter for attaching a handheld firearm to an unmanned air vehicle comprising:
    a mounting assembly configured for attachment to said firearm and to said unmanned air vehicle; and
    an actuation assembly comprising a first actuation device configured to actuate a trigger of said handheld firearm, a second actuation device configured to actuate a safety mechanism of said handheld firearm and a releasable link coupling between the second actuation device and the safety mechanism, said releasable link coupling arranged to release an attachment between said second actuation device and said safety mechanism upon application of a predetermined amount of torque.

2. The adapter of claim 1, wherein said mounting assembly comprises a recoil isolation mechanism.

3. The adapter of claim 1, wherein said mounting assembly comprises a first portion slidably engaged with a second portion.

4. The adapter of claim 3, wherein said mounting assembly further comprises a biasing member.

5. The adapter of claim 4, wherein said biasing member is positioned between the first portion and the second portion.

6. The adapter of claim 5, further comprising a damper, wherein said biasing member and said damper are located on opposite sides of the first portion.

7. The adapter of claim 4, wherein said biasing member forces said first portion to a nominal position.

8. The adapter of claim 1, wherein said mounting assembly comprises a truss member fixedly attached to said handheld firearm.

9. The adapter of claim 8, wherein said mounting assembly further comprises a support bracket, said truss member slidably engaged with said support bracket.

10. The adapter of claim 9, further comprising a shaft, said shaft being slidably engaged with said support bracket or said truss member.

11. The adapter of claim 10, wherein a longitudinal axis of said shaft is parallel to a longitudinal axis of a barrel of said handheld firearm.

12. The adapter of claim 1, wherein said actuation assembly comprises a body configured to be supported by a body of said handheld firearm.

13. The adapter of claim 1, said actuation assembly further comprising a locking mechanism configured to prevent actuation of said safety mechanism.

14. The adapter of claim 1, wherein said actuation device comprises a servo motor.

15. The adapter of claim 1, wherein a barrel axis of the handheld firearm passes through a center of gravity of the UAV.

16. The adapter of claim 1, wherein said actuation assembly comprises a roller configured to contact said trigger.

17. An unmanned air vehicle comprising:
    a structural framework;
    a commercially available firearm designed to be fired by hand, the firearm comprising a trigger and a safety;
    a mounting assembly, a first portion of said mounting assembly attached to said firearm, a second portion of said mounting assembly attached to said structural framework;
    a first actuator configured to actuate said trigger;
    a second actuator configured to actuate said safety; and
    a releasable link coupling between the second actuation device and the safety mechanism, said releasable link coupling arranged to release an attachment between said second actuation device and said safety mechanism upon application of a predetermined amount of torque.

18. The unmanned air vehicle of claim 17, wherein said mounting assembly comprises a recoil absorbing mechanism that isolates the structural framework from recoil forces generated by the firearm.

19. The unmanned air vehicle of claim 18, wherein said mounting assembly only contacts a barrel of the firearm.

20. An unmanned air vehicle comprising:
    a structural framework;
    a firearm designed to be fired by hand, the firearm comprising a body, a trigger, a safety and a barrel;
    a mounting assembly attaching said firearm to said structural framework, a first portion of said mounting assembly attached to said barrel of said firearm, a second portion of said mounting assembly attached to said structural framework, said mounting assembly comprising a recoil absorbing mechanism; and
    a first actuator configured to actuate said trigger; a second actuator configured to actuate said safety; and a releasable link coupling between the second actuation device and the safety mechanism, said releasable link coupling arranged to release an attachment between said second actuation device and said safety mechanism upon application of a predetermined amount of torque; wherein said mounting assembly only contacts the barrel of the firearm.

21. The unmanned air vehicle of claim 20, wherein said firearm is a grenade launcher.

* * * * *